(12) United States Patent
Joyce et al.

(10) Patent No.: US 9,158,729 B1
(45) Date of Patent: Oct. 13, 2015

(54) CLIENT REQUEST PROCESSING USING PROTOCOL ABSTRACTION

(71) Applicants: Scott E. Joyce, Foxboro, MA (US); Bruce R. Rabe, Dedham, MA (US); Norman M. Miles, Bedford, MA (US)

(72) Inventors: Scott E. Joyce, Foxboro, MA (US); Bruce R. Rabe, Dedham, MA (US); Norman M. Miles, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 377 days.

(21) Appl. No.: 13/626,299

(22) Filed: Sep. 25, 2012

(51) Int. Cl.
*H04L 12/54* (2013.01)
*G06F 15/16* (2006.01)
*G06F 13/00* (2006.01)

(52) U.S. Cl.
CPC .............. *G06F 15/16* (2013.01); *G06F 13/00* (2013.01)

(58) Field of Classification Search
CPC ............. H04L 29/08549; H04L 67/1097
USPC ......................................... 709/203
See application file for complete search history.

(56) References Cited

U.S. PATENT DOCUMENTS

| | | | |
|---|---|---|---|
| 2005/0228835 A1* | 10/2005 | Roa ............................... | 707/204 |
| 2013/0054890 A1* | 2/2013 | Desai et al. .................... | 711/114 |
| 2014/0006731 A1* | 1/2014 | Uluski et al. .................. | 711/155 |

* cited by examiner

*Primary Examiner* — David Lazaro
*Assistant Examiner* — Zia Khurshid
(74) *Attorney, Agent, or Firm* — Muirhead and Saturnelli, LLC (57) ABSTRACT

Described are techniques for processing a request. The request is sent from a command layer to a protocol abstraction layer. The request is to perform an operation on a first object of a first object type and the request includes one or more parameters. The protocol abstraction layer selects a first of a plurality of protocols and a first of a plurality of runtime paths for processing the request. The first protocol is selected in accordance with criteria including any one or more of the first object type, the operation being requested, and the one or more parameters. The request is processed in accordance with the first protocol and the first runtime path.

20 Claims, 6 Drawing Sheets

CLIENT REQUEST PROCESSING USING PROTOCOL ABSTRACTION

BACKGROUND

1. Technical Field

This application relates to techniques used in connection with processing requests.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations. The requests may be issued using different protocols and associated interfaces depending on what one or more protocols are supported for use with the particular client.

SUMMARY OF THE INVENTION

In accordance with one aspect of the invention is a method for processing a request comprising: sending the request from a command layer to a protocol abstraction layer, wherein the request is to perform an operation on a first object, the first object being of a first object type and the request including one or more parameters; selecting, by the protocol abstraction layer, a first of a plurality of protocols and a first of a plurality of runtime paths for processing the request, wherein said first protocol is selected in accordance with criteria including any one or more of the first object type, the operation being requested, and said one or more parameters; and processing the request in accordance with the first protocol and the first runtime path. The command layer and the protocol abstraction layer may be layers included in a client issuing the request. The request may be a request to return first information about the first object to the command layer and the first information may be identified using the one or more parameters of the request. The first information may include any of a property of the first object and a property of a second object associated with, or embedded within, the first object. The first information may include a first property of the first object, and a second property of a second object associated with, or embedded within, the first object. The protocol abstraction layer may perform first processing to select the first protocol because the first protocol allows for requesting, in a single request issued from the client to a server, one or more properties of the first object and one or more properties of the second object associated with, or embedded within, the first object. The first information may be returned from the protocol abstraction layer to the command layer in a first form. The first form may be a common form in which the first information is returned to the command layer independent of which of the plurality of protocols is selected by said selecting, said first form including the first property and the second property. A second of the plurality of protocols may maintain a client-side cache used by the protocol abstraction layer, and wherein said selecting may select the second protocol resulting in processing the request in accordance with a second of the plurality of runtime paths if the first protocol is not supported. The client-side cache may include the first object and the second object and the second runtime path may include performing first processing including: obtaining the first property of the first object and the second property of the second object from the client-side cache; placing the first information including the first property and the second property in the first form; and returning the first information in the first form to the command layer. The client-side cache may be updated in response to indications received from the server providing notification regarding changes to data stored in the client-side cache. The protocol abstraction layer may include a protocol adapter interface which receives the request from the command layer and performs said selecting. The client may include a presentation layer which issues the request to the command layer. The client may include one or more communication layers. The first runtime path may include issuing a call from the protocol abstraction layer to the one or more communication layers, and issuing a call from the one or more communication layer to a server. The protocol abstraction layer may include a first adapter for the first protocol and a second adapter for a second of the plurality of protocols. The second adapter may be an adapter which obtains the first information from a cache of the client including simulated data storage configuration data, and wherein the first protocol and first runtime path may be used to obtain the first information using data storage configuration obtained from a server in communication with the client.

In accordance with another aspect of the invention is a computer readable medium comprising code stored thereon for processing a request, the computer readable medium comprising code for: a presentation layer which provides a user interface; a command layer which receives the request from the presentation layer, said request being a request to perform an operation with respect to a first object of a first object type, said request optionally including a first set of one or more parameters; a protocol abstraction layer which receives the command from the command layer, said protocol abstraction layer including: a protocol adapter interface that receives the command from the command layer and selects one of a plurality of protocols and a first of a plurality of runtime paths for processing the request, wherein said first protocol is selected in accordance with criteria including any one or more of the first object type, the operation being requested, and any parameters of the first set; and a plurality of protocol adapters, wherein the plurality of adapters includes a protocol adapter for each of the plurality of protocols. The protocol adapter interface may transfer runtime control to a first of the plurality of protocol adapters corresponding to the selected one protocol included in the first runtime path. The protocol adapter interface may transform the request into a form based on a defined interface of the selected one of the plurality of protocols. The request may be a request to return first information about the first object to the command layer and the first information may be identified using said one or more parameters of the request. The one or more parameters may include a first property of the first object and a second property of a second object associated with, or embedded within, the first object. The protocol adapter interface may perform first processing to select the first protocol because the first protocol allows for requesting, in a single request issued from a client including the computer readable medium to a server, one or more properties of the first object and one or more properties of the second object associated with, or embedded within, the first object.

In accordance with another aspect of the invention is a system comprising: a client including a computer readable medium comprising code stored thereon for processing a request, the computer readable medium comprising code for: a presentation layer which provides a user interface; a command layer which receives the request from the presentation layer, said request being a request to perform an operation with respect to a first object of a first object type, said request optionally including a first set of one of more parameters; a protocol abstraction layer which receives the command from the command layer, said protocol abstraction layer including: a protocol adapter interface that receives the command from the command layer and selects one of a plurality of protocols and a first of a plurality of runtime paths for processing the request, wherein said first protocol is selected in accordance with criteria including any one or more of the first object type, the operation being requested, and any parameters of the first set; and a plurality of protocol adapters, wherein the plurality of adapters includes a protocol adapter for each of the plurality of protocols; and a server which receives and processes requests from the client. The server may be a data storage system and the client may be used in connection with displaying data storage configuration information and processing requests in connection with data storage management. The requests may include one or more requests to view selected portions of the data storage configuration information and one or more requests to modify an existing data storage configuration.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
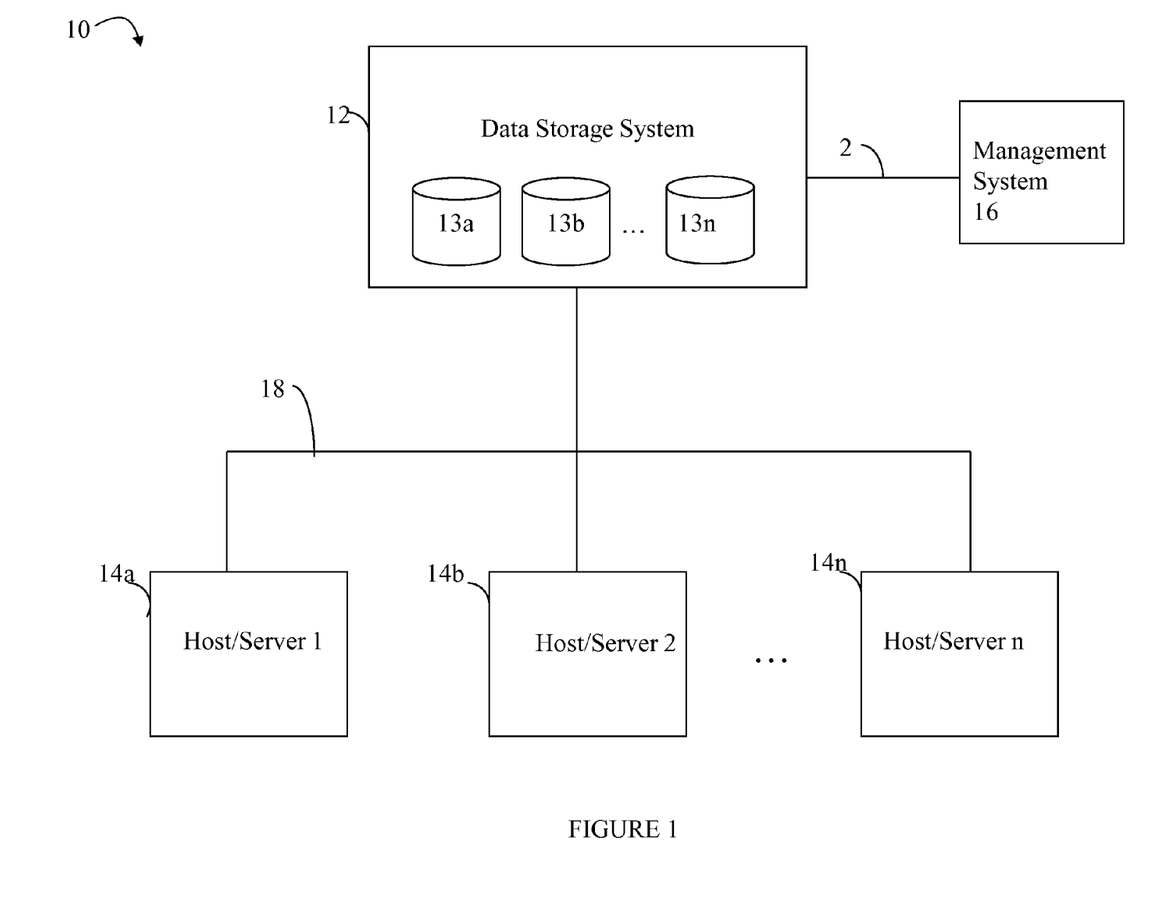
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
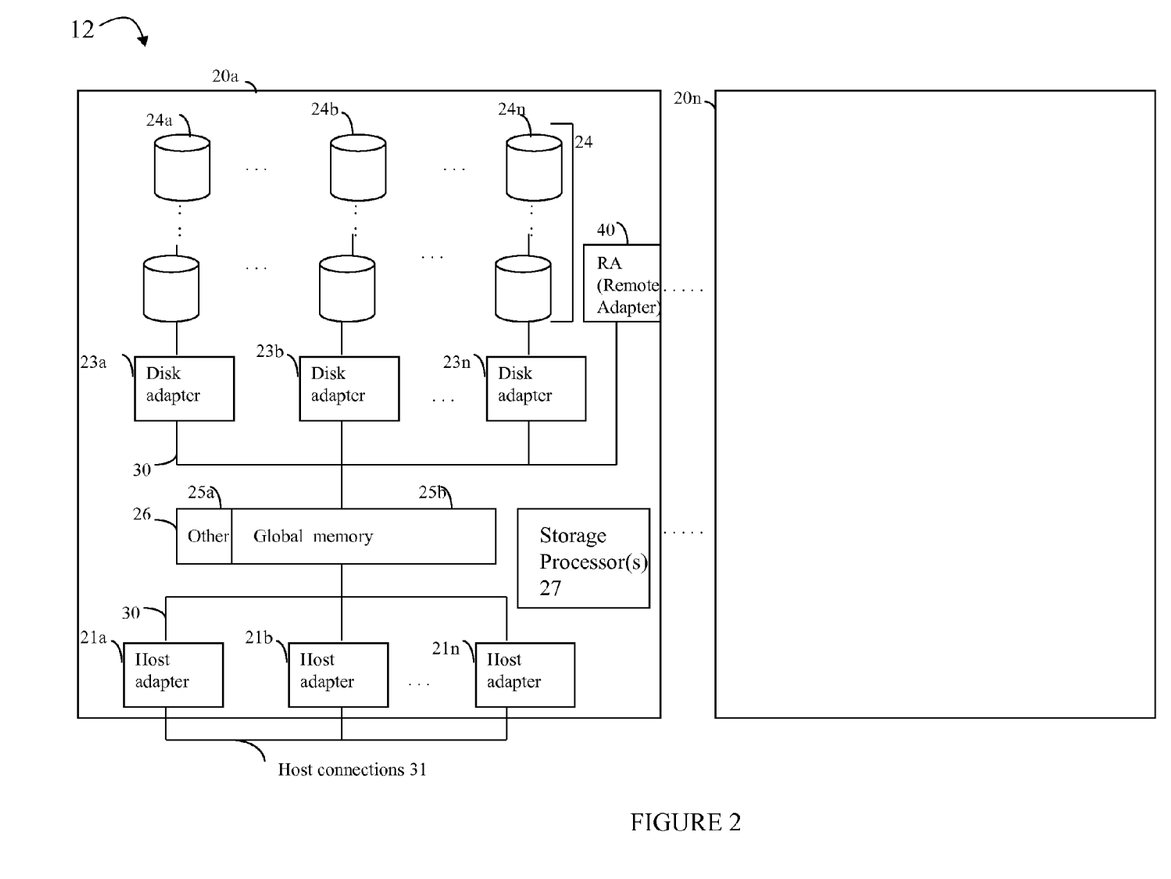
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26.

An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Management software may execute on the data storage system and/or management system. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

In connection with the data storage management software, or more generally, any software, various user inputs may be obtained in connection with performing a requested operation. For example, a user may select an operation to be performed in connection with data storage management. The user may also provide additional inputs specifying parameters for the operation using the GUI in connection with performing the requested operation. In some aspects, the management software may be characterized as a client which issues requests on behalf of a user to the data storage system to perform a data storage management operation or task such as, for example, view selected portions of data storage configuration information regarding a current configuration and state of the data storage system (e.g., list of currently defined LUNs, SGs of LUNs (e.g., an SG may be a logical entity of one or more associated LUNs), and the like), and create or modify the current data storage configuration (e.g., configure or provision physical storage for new LUNs from one or more physical devices (PDs), create or configure new RAID groups, create a new SG, modify an existing SG such as by adding or removing LUNs, and the like). In connection with such requests received at the data storage system from the management software, the management software may be characterized as client which is requesting an operation or service of the data storage system, whereby the data storage system may service the request thereby functioning generally as a server. A client request may be processed and issued to the server using one of possibly multiple protocols and associated APIs (application programming interfaces). The particular protocol(s) and APIs supported may vary with the particular client and/or server. For example, the particular protocols and APIs supported may vary with the data storage system. A client may use a first set of one or more protocols when communicating with a first type, make, or model of data storage system by a vendor, and the client may use a second set of one or more protocols when communicating with a second type, make or model of data storage system by the same or different vendor.

What will now be described are techniques for processing client requests which support the use of multiple protocols. An architecture is described which abstracts or separates the protocol from other upper software layers of the client so that the particular protocol selected and used to process a request is transparent to such upper software layers. Following paragraphs describe particular examples of a client and server whereby the client may be data storage system management software and the server may be a data storage system. However, techniques herein are more generally applicable for use with other clients and/or servers. Additionally, particular protocols, APIs, and the like, are described in following paragraphs as examples for purposes of illustration of the more general applicability of the techniques herein. The particular protocols, APIs, and the like, should not be construed as a limitation of any techniques described herein which may be used, more generally, with any protocol and/or API, as well as any number of protocols. The request from the client to the server may be made in accordance with the API or defined interface to request services of the server. As known in the art, the API may include a defined method or routine name and any parameters of appropriate types.

A protocol may be characterized as an interface of common means for two entities, such as two code modules, to communicate with each other. For example, in object oriented programming, the protocol may include definitions of methods and values which objects use to communicate. A protocol may include a description of the interface used for communication such as an application programming interface (API). The API may include names of defined routines which are invoked to perform a particular request or operation, arguments or parameters (input and/or output), and return values or results. Thus, a first API may be included in a first protocol to perform a first operation. A second API for a second protocol may not perform a similar operation or provide a similar service. Alternatively, the second API may perform the same first operation as the first API but the second API may use a different set of parameters than the first API. Additionally, the second API may be implemented by performing different processing than the first API. Thus, a protocol may be characterized as an interface as noted above whereby the interface may specify particular routines or code modules to be invoked and also identify parameters and return values when the routines are invoked. Additionally, a protocol may be characterized as providing a set of services or operations that may be requested by a client whereby the interface defines how to make such requests. In this manner, different protocols may also provide different set of services and varying functionality. Also, different protocols may perform a same or similar service requested by a client but each protocol may perform different processing to complete the requested operation and may also use a same or different API.

Figure 3:
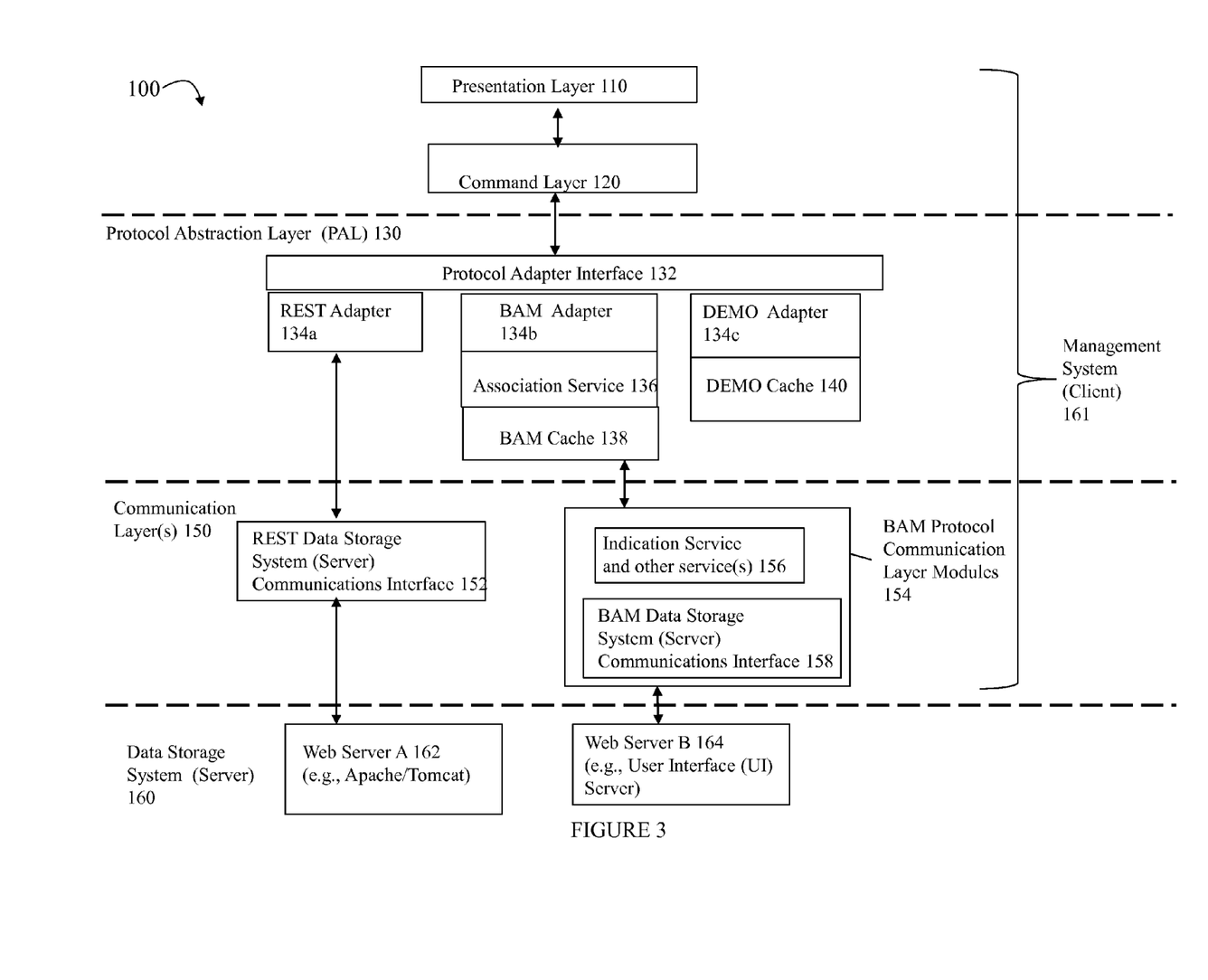
FIG. 3 is an example illustrating components and various layers of the client and server in an embodiment in accordance with techniques herein.

Referring to FIG. 3, shown is an example of different software layers of the client and server that may be included in an embodiment in accordance with techniques herein. The example 100 provides an architecture of different software layers of the client and server that may be used in connection with techniques herein. The example 100 includes a Presentation Layer 110, a Command Layer 120, a Protocol Abstraction Layer (PAL) 130, and one or more Communication Layers 150. The components of 110, 120, 130, and 150 may be included in a client system 161 (e.g., management system 16). Web servers 162, 164 may be included (along with other software not illustrated in FIG. 3) in the server system (e.g., data storage system 160).

The Presentation Layer 110 may generally be characterized as providing the UI for the management software. For example, the Presentation Layer 110 may display screenshots including various UI elements (e.g., menus, buttons, navigation or hyperlinks, and the like). The UI elements may provide for different user interactions. For example, a UI element may be a menu from which a user makes a selection to perform an operation, select parameters for the request, and the like. The Presentation Layer 110 may include code for creating the particular UI elements, displaying information and UI elements to the user, interacting with the user, and the like. For example, the Presentation Layer 100 may include code for implementing a UI including particular UI elements for a menu, menu items, tables, and the like. The UI elements may include a menu from which a user may select a menu item to perform a particular operation such as display a table of LUNs and properties for those LUNs. In one embodiment, object-based models may be used. For example, each physical and/or logical entity used by the client may be represented by a corresponding object having a set of properties. Each LUN, PD, SG, and the like, may be represented by an object having property values for that particular represented entity. For example, a PD may be a disk having a PD object with properties values based on the physical disk. The disk may have a storage capacity, unique identifier (ID), and type (e.g., FC 10K RPM rotating disk, FC 15K RPM rotating disk, flash or SSD storage device, and the like) where the property values of the PD object are set to denote those particular characteristics for the physical disk being represented.

The Command Layer 120 may receive a request to perform an operation from the Presentation Layer 110 and may form one or more commands and associated parameters. For example, the Presentation Layer 110 may issue a request to the Command Layer 120 to obtain and return a list of LUNs and one or more selected LUN properties of these LUNs. In turn, the Command Layer 120 may issue the command to the PAL 130. Thus, for each operation such as requested by the user via the UI, the Command Layer 120 may issue commands to lower software layers to perform the requested operation. As described in more detail below, the commands may include requests to read or retrieve data from the server which is then returned to the Command Layer and then the Presentation Layer. The commands may also include commands to perform a requested service or operation and may result in writing data (e.g., update or create new instances of data) regarding the configuration to the server.

The PAL 130 generally abstracts, insulates or hides from the upper layers 110, 120 the particular protocol(s) supported in an embodiment and also makes transparent to the upper layers 110, 120 the particular processing performed to obtain the requested data and/or perform the requested operation. The PAL 130 may also perform processing to allow the command layer 120 to interact with the PAL 130 using a same common API regardless of which protocol(s) are supported or otherwise selected for processing a command. The PAL 130 may perform processing to map the common command format sent by the Command Layer into the required format (e.g., API) that may be necessary to use a particular protocol. In this manner, a consistent and common set of API services may be provided to the Presentation Layer 110 regardless of the services and various APIs that may be provided by the different protocols. The different protocols may expose the same client-side object model to the Presentation Layer but different protocols may provide different or varying services such as, for example, allowing an embedded or associated object to be specified as a parameter, filtering, sorting, paging, localization (e.g., for different spoken languages), and the like. In some embodiments, different protocols may be supported for use with different data storage systems and/or management software. The architecture described herein provides the PAL 130 as the layer separating the protocols from the Presentation Layer and client object model. The architecture provides the same set of services to the Presentation Layer using a common format and interface. If a supported or available protocol does not directly provide a service, additional processing may be performed on the client to provide the requested service in combination with a supported or available protocol. This is described in more detail in following paragraphs.

The PAL 130 may include a Protocol Adapter Interface (PAI) 132 and other modules for different supported protocols. In this example, three different protocols may be supported whereby each supported protocol may have a set of modules in the PAL 130 used for that particular protocol when processing a command from the Command Layer 120. The three supported protocols may include a REST (Representational State Transfer) protocol, BAM (comBined dAta Model) protocol, and a Demonstration (DEMO) protocol. The BAM protocol may be generally characterized as a proprietary protocol based on XML (extended markup language). The REST protocol is known in the art and may be used in connection with web services. The DEMO protocol as described herein may be used in connection with providing a demonstration or otherwise use a set of simulated configuration data rather than use actual configuration data. In this manner, upper layers 110, 120 may be provided with a set of data storage configuration information without requiring interaction with the data storage system. One such use of this DEMO protocol may be, for example, in connection with testing software of layers 110, 120 using different data storage configuration data without requiring the actual hardware of the data storage system. The REST protocol may use the REST protocol adapter (or REST adapter) 134a. The BAM protocol may use the BAM protocol adapter (or BAM adapter) 134b, Association Server 136, and BAM Cache 138. The DEMO protocol may use the DEMO protocol adapter (or DEMO adapter) 134c) and DEMO cache 140. It should be noted that each of the protocols may also use additional modules not illustrated in the PAL 130.

The PAI 132 interfaces/communicates with the Command Layer 110. The PAI 132 may receive commands from the Command Layer 120 and then select which protocol and code execution path is used to perform processing for the request from the Command layer. A different code execution path may be performed for each of the different protocols depending on which protocol and associated runtime code path the PAI determines should be used to service the command.

The Communication Layer(s) 150 may include software on the client which communicates with the server to transmit a request to perform an operation and obtain any requested information returned from the server, and the like. Different portions of the Communications Layer 150 may be used in accordance with the particular protocol being used to process the command. The REST Data storage system (server) communications interface (or REST-DS interface) 152 may be used in connection with communications between the PAL 130 and the data storage system 160. The BAM protocol communication layer modules 154 may be used in connection with communications between the PAL 130 and the data storage system 160. The BAM protocol communication layer modules 154 may include an indication server and other services 156 and the BAM data storage system (server) communications interface (or BAM-DS interface) 158. The various modules of layers 130 and 150 are described in more detail elsewhere herein.

The different supported protocols of REST and BAM may communicate with different web servers of the data storage system 160 depending on the particular protocols supported by the different web servers. For example, when processing a command using the REST protocol, the REST-DS interface 152 of Communication Layer 152 may issue requests to web server A 162 which may be an Apache/Tomcat web server. When processing a command using the BAM protocol, the BAM-DS interface 158 of the Communication Layer 152 may issue requests to web server B which may be a UIS (User Interface Server) web server. Although not illustrated, the web servers 162, 164 of data storage system 160 may communicate with other components, such as a database or data store including the data storage system configuration information. Additionally, the data storage system 160 may include components which use polling or other techniques to gather state and configuration data regarding the current data storage system. For example, the data storage system may include hardware components as described in connection with FIGS. 1 and 2 and additionally include other software which monitors and collects information regarding the data storage system (e.g., changes in the status of particular physical entities change over time, information regarding the addition and removal of physical entities such as storage devices, fans, power supplies and the like) and populates the data store including the configuration data.

The PAI 132 of the PAL may, for example, select one of the particular protocols depending on the particular object type, command parameters, and/or requested operation in accordance with capabilities and services of each protocol. For example, it may be that performing particular operations on certain object types are implemented using the REST protocol and associated runtime code path and other operations on different object types may be implanted using the BAM protocol and associated runtime code path. To further illustrate, the Command Layer may issue a request to the PAL to perform an operation to SET (e.g., write) or GET (e.g., read) properties of a LUN object which may be supported by the REST protocol. In contrast, the request from the Command layer to the PAL may be an operation to SET or GET properties of a different type of object which may be supported not by the REST protocol but rather by the BAM protocol. Particular services or types of requests may also be supported by one protocol but not the other. This, as well as other suitable techniques may be used by the PAI in connection with selecting and forwarding the request to the appropriate protocol adapter (e.g., REST Adapter 134a, BAM adapter 134b or DEMO adapter 134c) of the PAL for processing. As another example, if the request from the Command Layer includes any embedded or associated object (as a type of service), the REST protocol and associated code path may be used to process the request rather than the BAM protocol and associated code path. However, an embodiment may use the BAM protocol and associated code path rather than the REST protocol and associated code path if the BAM cache 138 (described below in more detail) currently includes all the objects needed to formulate the information returned to the Command layer. This may therefore eliminate the need of performing any calls from the client to the server since the BAM cache 138 of the client already includes the data needed to respond to the request.

The PAI 132 may select one of the multiple protocols and transfer runtime control to an appropriate one of the adapters 134a-c for the selected protocol. For example the PAL may include a REST Adapter 134a, a BAM adapter 134b and a DEMO adapter 134c. The REST Adapter 134a may be a first adapter used and included in the runtime path when a first protocol, the REST protocol, is selected. The BAM Adapter 134b may be a second adapter used and included in the runtime path when a second protocol, the BAM protocol, is selected. The DEMO Adapter 134c may be a third adapter used and included in the runtime path when a third protocol is selected. The third protocol and associated runtime path may be used in connection with simulated configuration data, or more generally, simulated server data, rather than using actual data obtained from the server, such as the data storage system. In this manner, the third protocol may be selected when simulating services of the server. Such simulation may have a variety of different suitable uses and applications such as, for example, when testing client-side software in the runtime stack above the DEMO adapter (e.g., software of the Presentation and/or Command layers) without requiring a server. The PAL 130 may also send and receive data from the Command Layer 120 in a single common form and format (e.g., using the same API) independent of the selected protocol by the PAL. Thus, the PAI 132 may perform processing to transform data, such as the request received from the Command Layer, into a form and format in accordance with an API used by the selected one of the Protocol Adapters (e.g., REST Adapter, BAM Adapter and DEMO Adapter). Similarly, the PAI 132 may perform any processing of return data returned up a call stack or runtime path whereby such return data may be received from the selected one of the Protocol Adapters 132a-c. The return data (which may be returned by any of the Protocol Adapters 132a-c) may be placed into the common form and format which is then returned to the Command Layer 120.

The BAM protocol may maintain a client-side cache, BAM cache 138, at the PAL level 130 whereby the BAM cache 138 may be kept up to date with a set of objects. Using the BAM protocol, modules in the PAL level implementing the BAM protocol may utilize an indication service 156 of the Communication Layer providing updates. The server/data storage system 160 may, for example, provide updates to the Indication Service of the Communication layer regarding changes (e.g., updates to objects and/or properties, deletion of objects and/or properties, creation of objects, and the like) to configuration data objects that may be cached in the BAM cache 138. In turn, the Indication service 156 may provide such updates to the modules in the PAL maintaining the BAM cache 138. The foregoing may be performed in an asynchronous manner, for example, as changes are made to the data storage configuration on the server/data storage system 160. As known in the art, such changes may include, for example, addition/removal of a PD, change in state of a physical or logical entity of the data storage system (e.g., regarding a functional state of a PD, power supply, fan, and the like). For example, the BAM cache 138 may be used to store different objects which may be related or associated with one another. The BAM cache 138 may include a LUN object and PD objects. Each LUN object may be associated with one or more PDs providing the underlying physical storage for the LUN. The BAM cache 138 may store the LUN objects, PD objects, and the like. A request from the Command Layer as described elsewhere herein may include retrieving properties about a LUN and also properties about embedded or associated PD objects for the LUN providing the backing physical storage for the LUN. To service the request using the BAM protocol thereby requires retrieving the LUN object and its properties, determining the associated PD objects for the LUN, and then retrieving the desired properties for the PDs from the PD objects. The association service 136 may be used in connection with determining associated or embedded objects using BAM cache 138 and/or retrieving particular property values from such associated or embedded PD objects. In this manner, the BAM protocol may use modules of PAL 130 to extract desired objects and properties from the BAM cache 138 and construct the resulting structure of information to be returned to the Command Layer 132. This is described in more detail elsewhere herein. If the command is set or write request, the BAM cache 138 may be updated and other services of the modules 154 may then communicate such updates to the server 160. Once a command processed in accordance with the BAM protocol has been completed, control returns to the BAM adapter 134b. A return status regarding the requested operation may be returned along with any requested data from BAM adapter 134b, to PAI 132, Command Layer 120, and then to Presentation Layer 110.

In contrast to the BAM protocol, the REST protocol and associated modules used in the layer 130 may not maintain a PAL level cache and may not perform such processing as described above using the BAM cache 138. Rather, when using the REST protocol, the command received by REST adapter 134a is communicated to the REST-DS interface 152, and then to the server 160. Additionally, as described elsewhere herein, the REST protocol allows for specifying embedded object associations in a single API call to the server 160. Thus, the Command layer request including embedded or associated object references may be processed by having the REST adapter 134a of the PAL issue a single request to the Communications layer 150 which, in turn, issues a single request to the server 160 to read or write the requested information. For a request, the Server 160 may include services which return an operation completion status and any requested information to the REST-DS interface 152, REST adapter 134a, PAI 132, Command Layer 120 and then to the Presentation Layer 120. In this manner, using the REST protocol and associated runtime code path, the requested information and completion status regarding the requested operation may be returned to the Presentation Layer 110 up the call stack (e.g., the runtime call stack in opposite order in which the command was issued from the client to the server).

If the command is forwarded by the PAI to the DEMO adapter 134c, the operation may be performed to read and/or write data storage configuration data that may be stored in the DEMO cache 140. Control may then be returned to the DEMO adapter 134c which may return an operation status and any requested information to the PAI 132, Command Layer 120 and then to the Presentation Layer 110. As noted above, the DEMO protocol and adapter 134c may be used when simulating a data storage configuration and/or when simulating performing any requested data storage configuration changes. In this manner, the DEMO cache 140 may include the simulated data storage configuration data used by the DEMO adapter 134c rather than make any calls to the data storage system/server 160 using actual configuration data.

As described herein, the PAI 132 may use any suitable technique to select the particular protocol and adapter 134a-134c used to process a received command from the command layer 120.

Although not specifically illustrated in FIG. 3, the Command Layer 120 may temporarily store a cache of objects based on information returned from the PAL 130 where the cached objects of the Command Layer may be used in connection with providing information to the Presentation Layer 110. The Command Layer 120 may deallocate or remove such objects from its local cache once the requested information has been returned to the Presentation Layer.

The BAM cache 138 may store objects in any suitable format which may differ from the that of the Command Layer's cache. In one embodiment, the objects of the BAM cache 138 may be stored as name-value pairs in a format different than the Command layer cache. For example, in one embodiment, the BAM cache may use hash tables or maps of name-value pairs for the objects and associated property values. An array of hash maps may store information for all objects of a certain object type, such as LUN or PD. There may be such an array of hash maps for each type of object. Thus, each array of hash maps be correspond to a table of objects of a particular object type. An array of hash maps may represent, for example, a LUN list or array of LUNs in the data storage system. There may be a single hash map in the array for each LUN object. The hash map for a LUN object may include name-value pairs corresponding to the pairings of property name and associated property value for the LUN object. Generally, given the object type (e.g., LUN, PD, and the like), the appropriate table of objects of the particular type may be selected from the BAM cache 138. Once the correct table of objects (array of hash maps) is selected, such as for the LUN object type, an element (hash map) of the hash map array for LUNs may now be selected for a particular LUN of interest.

As mentioned, one feature with a RESTful protocol and API is the ability to retrieve information (such as properties or attributes) regarding embedded objects. With the REST protocol properties may be returned from the server for a first object and also its associated objects in the same network call from the client to the server. This is in contrast to other protocols, such as BAM, which may require use of multiple calls to obtain the desired information (e.g., a first call to the server to obtain the first object and then one or more additional calls to the server to obtain information on associated objects since such other protocols may not allow specifying a parameter which is an embedded object or property thereof). The feature of associated or embedded object information may be provided as a common service to the Presentation Layer. However, the manner in which the data is acquired or processed to provide this feature varies depending on whether the particular protocol selected is REST or BAM.

As an example, consider the Presentation Layer 110 issuing a request to the Command Layer 120 to get a list of LUNs currently defined in the data storage system as described above. The Presentation Layer needs such information to be displayed on a UI. Additionally, for each LUN in the list, the Presentation Layer 110 needs to retrieve only selected LUN object properties, a list of PDs providing the LUN's physical storage, and only selected PD object properties for the PDs on the list. The Command Layer 120 may perform processing to allocate storage in its local cache for a new instance of the object(s) being requested. The Command Layer may issue a GET command to the PAL 130 such as:

Get_ list LUN ("name", "LUN_ID", PD.ID, PD.CAPACITY)

to obtain for each currently configured LUN the LUN properties "name" and "LUN_ID" (LUN identifier). Additionally, each LUN has a list of one or more associated PD objects. For each such PD, return the PD's ID (e.g., denoted as PD.ID) and capacity (e.g., denoted as PD.CAPACITY). In this example, the parameters of embedded or associated objects are denoted using the "." notation indicating a reference to another embedded object of type PD. It should be noted that although only a single level of embedded object references are illustrated above, an embodiment may allow a parameter to include multiple embedded object reference levels.

Figure 4:
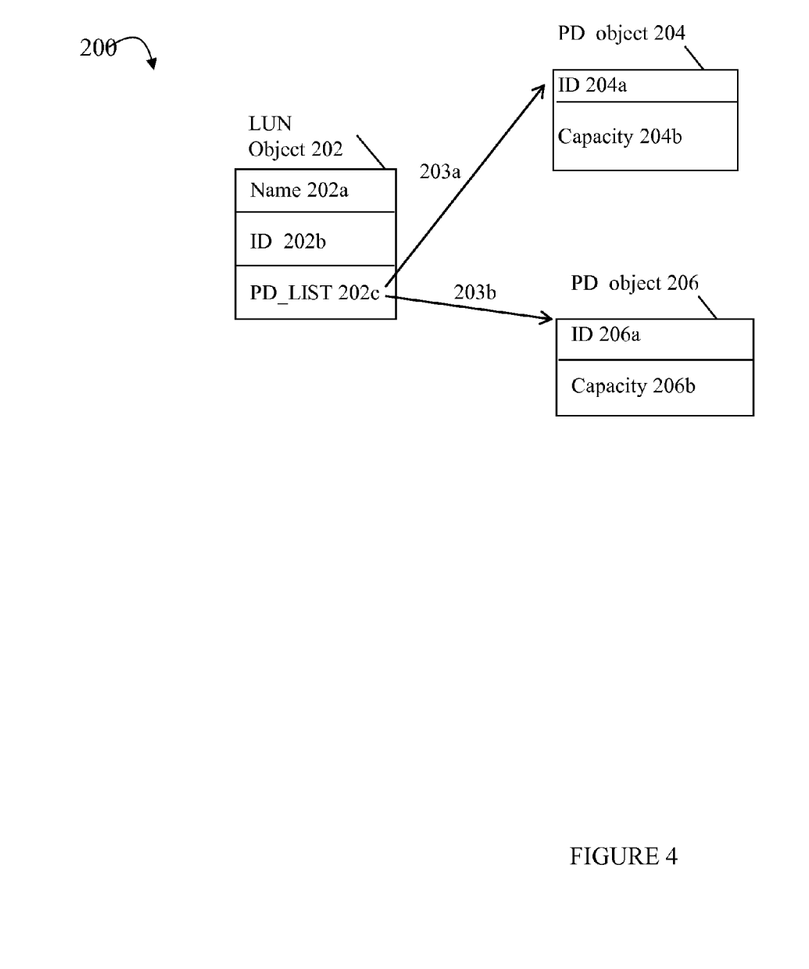
FIGS. 4 and 5 are examples illustrating objects that may be utilized in an embodiment in accordance with techniques herein.

Referring to FIG. 4, shown is an example representation of the objects for a single LUN. The example 200 includes LUN object 202 comprising the properties name 202a, ID 202b and PD_LIST 202c (list of PDs providing backing physical storage for LUN). The associations between LUN object 202 and its two related PD objects 204, 206 are illustrated with arrows 203a, 203b. PD object 204 includes properties ID 204a (e.g., unique identifier for the PD) and Capacity 204b (e.g., storage capacity of the PD). Although FIG. 4 shows information for only a single LUN object, such information may be a representation of objects included in the client object model for each LUN. For the above-mentioned Get command, all LUN properties 202a-c are requested for each LUN. Additionally, for each PD identified by property 202c, the PD properties ID and capacity are also requested. Thus, the cache of the Command Layer 120 may include storage for the objects of 200 for each LUN. Embedded or associated objects may be implemented using arrays, pointers, and/or any other suitable technique known in the art. For example, a LUN may have an array of PD objects. Alternatively, the embedded or associated objects may be represented using pointers or other techniques to reference the association between the LUN and its backing PDs.

When the GUI is starting up, one or more command such as the foregoing Get command may be issued to obtain information used to initially populate a GUI display. Once the GUI is done using the objects of the Command Layer, the Command Layer may deallocate and remove such objects from its cache.

As noted above, a parameter specified in the Get or other command may include a reference to an embedded object where such references may include multiple levels of embedded or associated objects as will now be illustrated.

Figure 5:
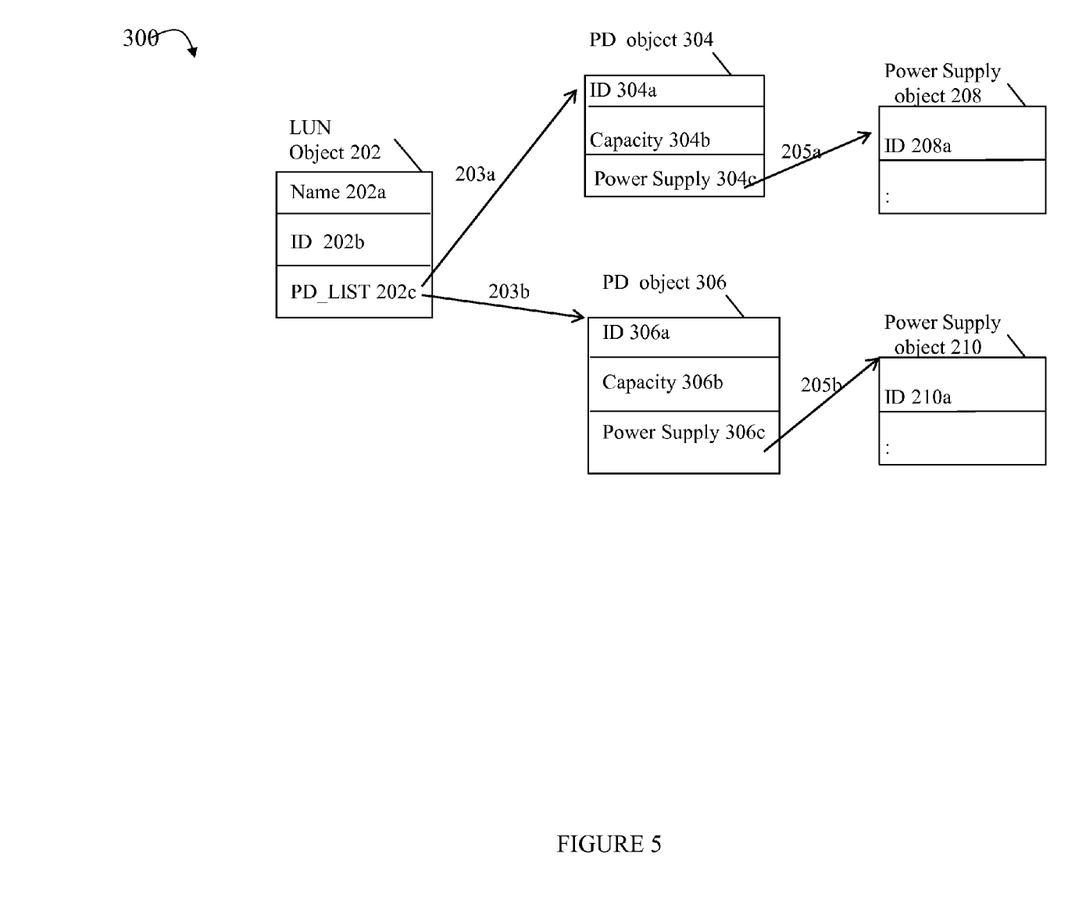

Referring to FIG. 5, shown is an example representation of the objects for a single LUN. The example 300 of FIG. 5 is similar to that as described in connection with FIG. 4 with the additional embedded objects 208, 210. PD object 304 includes properties ID 304a (e.g., unique identifier for the PD), Capacity 304b (e.g., storage capacity of the PD) as in element 204 of FIG. 4 along with the additional property of power supply 304c (e.g., backup power supply used for the PD in the event of power failure of primary power supply). Similarly, PD object 306 includes properties ID 306a (e.g., unique identifier for the PD), Capacity 306b (e.g., storage capacity of the PD) as in element 206 of FIG. 4 along with the additional property of power supply 306c (e.g., backup power supply used for the PD in the event of power failure of primary power supply). The associations between each PD object 304, 306 and its respective related Power supply object 208 210 are illustrated with arrows 205a, 205b. In connection with FIG. 5, the Get_list command may also specify an embedded object property to be returned which is a the ID property of the Power supply objects 208, 210 for each PD in the PD list 202c as "PD. Power supply.ID" to denote the multiple levels of associations referencing the desired property values for 208a, 210a.

Continuing with the example from FIG. 4 using the Get_list LUN command, the PAL 130 may receive the command and may issue one or more commands to lower layers depending on the particular protocol and associated runtime stack or path used to ultimately issue calls to the server/data storage system. Additionally, code of the PAL may also perform processing as needed to place the requested information in the same form (returned to the Command Layer) independent of which protocol and associated runtime stack is utilized. In other words, the PAL may return the requested information to the Command Layer in the same form whether the underlying supported protocol (and its associated client-server API) is in accordance with REST, BAM, or the DEMO protocol. However, the PAL may obtain the requested information in different ways using different lower-level software layers (e.g., by issuing different call(s) in type and number to the server, and like). Furthermore, as described herein in connection with the BAM protocol, code of the PAL implementing the BAM protocol may also cache information returned from the data storage system/server and use such cached information in forming the information returned to the Command layer. For example, as described elsewhere herein in more detail, a first runtime stack including first components in the PAL, Communication Layer and server/data storage system may be invoked when operating in accordance with the REST protocol to service the request. A second runtime stack including second components (different from the first components) in the PAL may be invoked when operating in accordance with the BAM protocol. In connection with the first runtime stack using REST, a single call may be made from the client to the server to obtain the list of LUNs, selected LUN properties for each LUN listed, backing PDs for each LUN listed, and selected properties of such PDs. However, as described elsewhere herein, different processing may be performed by the PAL when using the BAM protocol to obtain the same information which may be cached in the BAM cache 138. As yet another example when using the BAM protocol when the BAN cache 138 does not include the required objects, a first call may be made from the client to the server to obtain the list of LUNs and LUN properties. A second set of one or more calls may then be made from the client to the server to obtain the PDs (and PD properties thereof) providing the underlying physical storage for each listed LUN. Once the PAL has obtained the foregoing objects for the LUNs and PDs, the PAL may then cache the objects (e.g., cache the property values for the objects) in the BAM cache 138 and perform processing to selectively extract the desired properties of each object from the cache and create a set of return information for the Command layer which includes the same information in the same format/form as when operating in accordance with the REST protocol.

In this manner, there may be a first defined API between the Command layer and the PAL whereby the PAL abstracts (hides or insulates) the Command layer from any different protocols, data models, APIs, and the like, used in connection with the PAL communicating with the Communication layer(s) and between the Communication Layer(s) and the server (data storage system in this example). Thus, the PAL insulates the Command layer from details regarding the underlying lower layers utilized in connection with the runtime stack for performing the requested operation. To further illustrate, a set of defined APIs may be used in connection with PAL communicating with the different Communications Layers for the different protocols. For example, a second API may be used in connection with the PAL communicating with one or more components of the Communication Layers when using the REST protocol and a third API may be used in connection with the PAL communicating with one or more components of the Communications Layers when using the BAM protocol. Additionally, another set of defined APIs may be used in connection with the Communication Layers communicating with the server. For example, a fourth API may be used in connection with the Communication Layer communicating with the server when using the REST protocol and a fifth API may be used in connection with the Communication Layer communicating with the server when using the BAM protocol. Each particular API may include one more defined interfaces identifying, for example, any of input parameters, output parameters or return values, processing or services that may requested by the caller and performed by the called or invoked routine, and the like. In this manner, different APIs may exist between the different layers for the runtime stacks associated with each of the protocols when processing a request from the presentation layer.

It should be noted that in one embodiment, the Command layer may be notified in an asynchronous manner by the PAL when the PAL returns the requested information to the Command layer. In turn, the Command layer may also notify the Presentation layer in an asynchronous manner when returning the requested information to the Presentation layer. Additionally, communications between the client and server may also operate asynchronously.

Generally, commands issued by the Command Layer 120 to the PAL 130 may have a format of:

Command object type (parameter(s))

where "Command" may be a command or operation. All commands or operations may be generally partitioned into two classifications—GET and SET operations. GET operations may generally refer to commands which request retrieval of information that is returned up the runtime call stack (e.g., read operation where request is to return data, based on the optional parameter(s), to the Command layer). An example may be the Get_list command noted above. SET operations may generally refer to commands which request that information on the server be updated based on data included in the request (e.g., create a new object of a particular type, modify or update an attribute of an existing object of a particular type, delete an existing object of a particular type, and the like). The particular syntax and commands may vary with embodiment. With a SET command, the parameters may include name-value pairs where each pair may represent an object property and a value to be assigned to the property. For example, SET LUN (ID=5, PROP_A=V1) may be a request to set the property "PROP_A" to the value V1 for the LUN object having ID=5. As another example, a command may create a snapshot of a LUN object such as Create_SNAPSHOT LUN (ID=5, . . . . ) which may return a handle to the created snapshot.

Such commands as issued from the Command Layer to PAL may be further transformed, processed, or mapped in accordance with the particular commands, parameters, and the like, of API(s) supported for use with lower layers. For example, a command issued from the Command Layer to the PAL may be mapped into a first API call to the Communication layer, and in turn, to another API call to the server, based on the REST protocol. Alternatively, for BAM, modules of the PAL layer may perform processing to retrieve the necessary information from the BAM cache and store such information in a format to be returned to the Command layer. Thus, in this embodiment, the command from the Command layer may not result directly in a call to the server. Rather, the command may cause the modules of the PAL to perform the processing to retrieve and construct the data structure to be returned to the Command layer using the object information of the BAM cache 138 if the BAM protocol is utilized and such requested information is in BAM cache 138. As described elsewhere herein, the BAM cache may be populated using indications and updates provided by the server to the client. It may be that the command from the Command Layer may trigger retrieval of an initial set of data from the server to populate the BAM cache.

As described above in connection with FIG. 3, the PAI of the PAL is a common interface to the Command Layer for multiple protocols and associated runtime paths. The PAI may select one of multiple protocols and associated runtime paths for processing the command received from the Command Layer. The protocol and associated runtime path selected may be based on criteria including any of the object type, the service or operation requested, and/or the parameters of the command. When the command is a request to perform an operation for a first object, the parameters may refer to properties of the first object and/or properties of a second object associated with (or embedded within) the first object.

Figure 6:
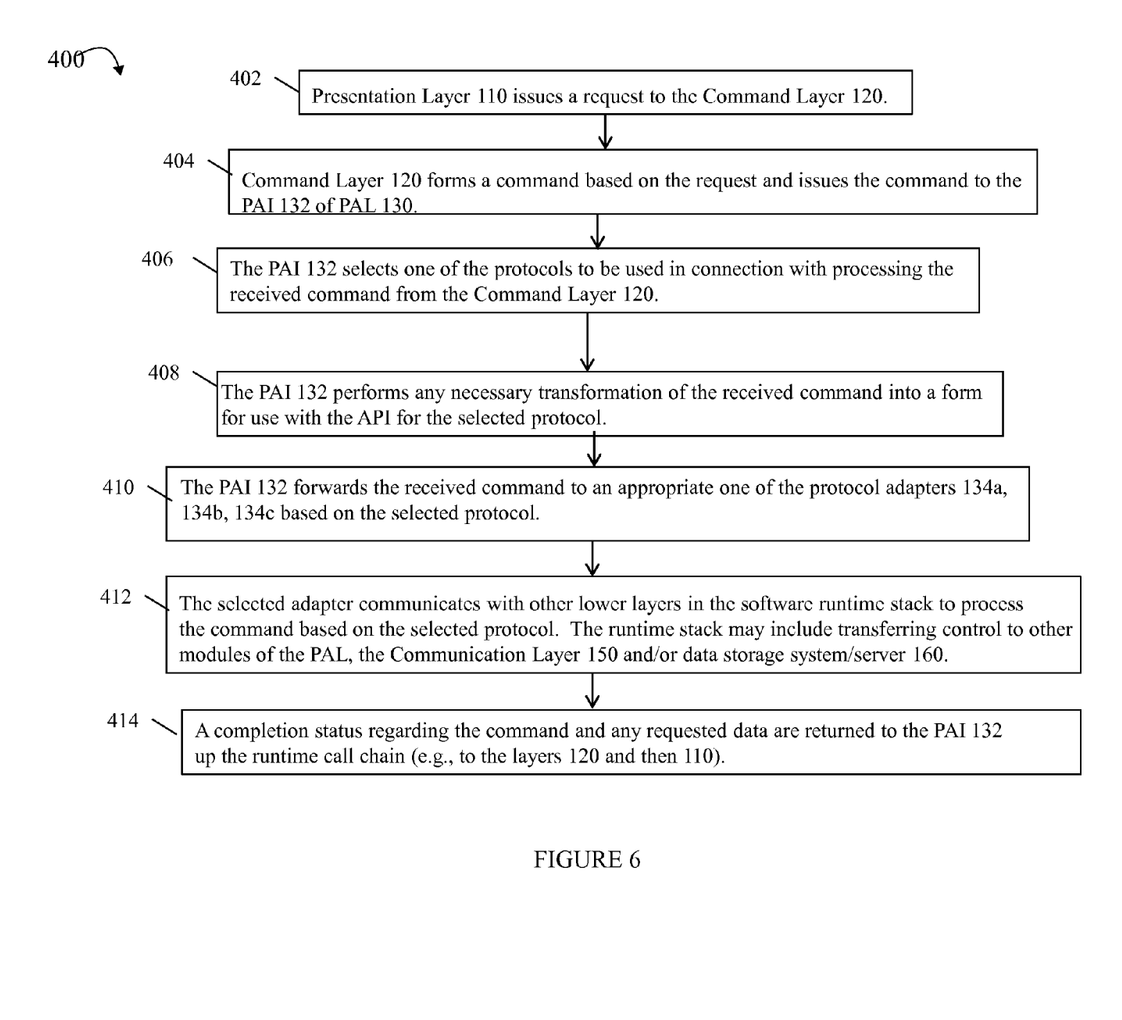
FIG. 6 is a flowchart of processing steps that may be performed in an embodiment in accordance with techniques herein.

Referring to FIG. 6, shown is a flowchart of processing steps that may be performed in an embodiment in accordance with techniques herein. The flowchart 400 summarizes processing steps described above. At step 402, the Presentation Layer may issue a request to the Command Layer. In step 404, the Command Layer may form a command based on the request and issue the command to the PAI 132 of the PAL 130. At step 406, the PAI selects one of the protocols to be used in connection with processing the command received from the Command Layer. In step 408 the PAI 132 performs any necessary transformation of the received command into a form for use with the API of selected protocol. At step 410, the PAI 132 forwards the received command to an appropriate one of the protocol adapters 134*a*, 134*b* or 134*c* based on the selected protocol. At step 412, the selected adapter communicates with other lower software layers in the runtime stack to process the command based on the selected protocol. The runtime stack may include transferring control to other modules of the PAL, the Communication Layer and/or the data storage system/server. At step 414, a completion status regarding the command and any requested data may be returned to the PAI 132 up the runtime call chain (e.g. to layer 120 and then layer 110).

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing a request comprising:
    sending the request from a command layer to a protocol abstraction layer, wherein the request is to perform an operation on a first object, the first object being of a first object type and the request including one or more parameters, wherein the protocol abstraction layer supports a plurality of protocols including a protocol that simulates services of a server using simulated server data and services requests without communicating with the server;

selecting, by the protocol abstraction layer, a first of the plurality of protocols and a first of a plurality of runtime paths for processing the request, wherein said first protocol is selected in accordance with criteria including any one or more of the first object type, the operation being requested, and said one or more parameters; and processing the request in accordance with the first protocol and the first runtime path.

2. The method of claim 1, wherein the command layer, and the protocol abstraction layer are layers included in a client issuing the request, and wherein the request is a request to return first information about the first object to the command layer, the first information being identified using said one or more parameters of the request.

3. The method of claim 2, wherein the first information includes any of a property of the first object and a property of a second object associated with, or embedded within, the first object.

4. The method of claim 3, wherein the first information includes a first property of the first object, and a second property of a second object associated with, or embedded within, the first object, and the protocol abstraction layer performs first processing to select the first protocol because the first protocol allows for requesting, in a single request issued from the client to the server, one or more properties of the first object and one or more properties of the second object associated with or embedded within, the first object.

5. The method of claim 4, wherein the first information is returned from the protocol abstraction layer to the command layer in a first form, said first form being a common form in which the first information is returned to the command layer independent of which of the plurality of protocols is selected by said selecting, said first form including the first property and the second property.

6. The method of claim 5, wherein a second of the plurality of protocols maintains a client-side cache used by the protocol abstraction layer, and wherein said selecting selects the second protocol resulting in processing the request in accordance with a second of the plurality of runtime paths if the first protocol is not supported.

7. The method of claim 6, wherein the client-side cache includes the first object and the second object and the second runtime path includes performing first processing, said first processing including:

obtaining the first property of the first object and the second property of the second object from the client-side cache;

placing the first information including the first property and the second property in the first form; and returning the first information in the first form to the command layer.

8. The method of claim 6, wherein the client-side cache is updated in response to indications received from the server providing notification regarding changes to data stored in the client-side cache.

9. The method of claim 2, wherein the protocol abstraction layer includes a protocol adapter interface which receives the request from the command layer and performs said selecting.

10. The method of claim 9, wherein the client includes a presentation layer which issues the request to the command layer.

11. The method of claim 10, wherein the client includes one or more communication layers and wherein the first runtime path includes issuing a call from the protocol abstraction layer to the one or more communication layers, and issuing a call from the one or more communication layers to the server.

12. The method of claim 9, wherein the protocol abstraction layer includes a first adapter for the first protocol and a second adapter for a second of the plurality of protocols, the second protocol being the protocol that simulates services of the server, the second adapter being an adapter which obtains the first information from a cache of the client including simulated data storage configuration data, and wherein the first protocol and first runtime path are used to obtain the first information using data storage configuration obtained from a server in communication with the client.

13. A non-transitory computer readable medium comprising code stored thereon that, when executed, processes a request, the non-transitory computer readable medium comprising:

a presentation layer which provides a user interface;

a command layer which receives the request from the presentation layer, said request being a request to perform an operation with respect to a first object of a first object type, said request optionally including a first set of one of more parameters;

a protocol abstraction layer which receives the command from the command layer, wherein the protocol abstraction layer supports a plurality of protocols including a protocol that simulates services of a server using simulated server data and services requests without communicating with the server, said protocol abstraction layer including:

a protocol adapter interface that receives the command from the command layer and selects one of the plurality of protocols and a first of a plurality of runtime paths for processing the request, wherein said first protocol is selected in accordance with criteria including any one or more of the first object type, the operation being requested, and any parameters of the first set; and a plurality of protocol adapters including a protocol adapter for each of the plurality of protocols.

14. The non-transitory computer readable medium of claim 13, wherein said protocol adapter interface transfers runtime control to a first of the plurality of protocol adapters corresponding to the selected one protocol included in the first runtime path.

15. The non-transitory computer readable medium of claim 13, wherein said protocol adapter interface transforms the request into a form based on a defined interface of the selected one of the plurality of protocols.

16. The non-transitory computer readable medium of claim 13, wherein the request is a request to return first information about the first object to the command layer, the first information being identified using said one or more parameters of the request.

17. The non-transitory computer readable medium of claim 16, wherein the one or more parameters include a first property of the first object and a second property of a second object associated with, or embedded within, the first object.

18. The non-transitory computer readable medium of claim 17, wherein the protocol adapter interface performs first processing to select the first protocol because the first protocol allows for requesting, in a single request issued from a client including the computer readable medium to the server, one or more properties of the first object and one or more properties of the second object associated with or embedded within, the first object.

19. A system comprising:
a client including a non-transitory computer readable medium comprising code stored thereon that, when executed, processes a request, the non-transitory computer readable medium comprising:
- a presentation layer which provides a user interface;
- a command layer which receives the request from the presentation layer, said request being a request to perform an operation with respect to a first object of a first object type, said request optionally including a first set of one of more parameters;
- a protocol abstraction layer which receives the command from the command layer, wherein the protocol abstraction layer supports a plurality of protocols including a protocol that simulates services of a server using simulated server data and services requests without communicating with the server, said protocol abstraction layer including:
  - a protocol adapter interface that receives the command from the command layer and selects one of the plurality of protocols and a first of a plurality of runtime paths for processing the request, wherein said first protocol is selected in accordance with criteria including any one or more of the first object type, the operation being requested, and any parameters of the first set; and
  - a plurality of protocol adapters including a protocol adapter for each of the plurality of protocols; and
the server which receives and processes requests from the client.

20. The system of claim 19, wherein the server is a data storage system and the client is used in connection with displaying data storage configuration information and processing requests in connection with data storage management, wherein the requests include one or more requests to view selected portions of the data storage configuration information and one or more requests to modify an existing data storage configuration.

* * * * *